US006883936B2

(12) United States Patent
Register et al.

(10) Patent No.: US 6,883,936 B2
(45) Date of Patent: Apr. 26, 2005

(54) SHUTTER APPARATUS, CURING LAMP HOUSING INCORPORATING SAME, AND METHOD OF SHUTTER REPLACEMENT

(75) Inventors: Justin Register, Cincinnati, OH (US); Mark Tausch, West Chester, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 116 days.

(21) Appl. No.: 10/407,220

(22) Filed: Apr. 7, 2003

(65) Prior Publication Data

US 2004/0070975 A1 Apr. 15, 2004

Related U.S. Application Data

(60) Provisional application No. 60/418,193, filed on Oct. 15, 2002.

(51) Int. Cl.$^{7}$ ........................ F21V 17/02; F21V 14/04; G01J 1/04

(52) U.S. Cl. ........................ 362/284; 362/321; 362/324; 34/277; 250/504 R

(58) Field of Search ................................ 362/217, 277, 362/282–284, 319, 321, 322, 324; 34/277; 250/492.1, 493.1, 455.1, 503.1, 504 R

(56) References Cited

U.S. PATENT DOCUMENTS

| | | | | |
|---|---|---|---|---|
| 1,744,369 A | * | 1/1930 | Dietz et al. | 362/324 |
| 2,108,633 A | | 2/1938 | Wiegand et al. | |
| 2,393,616 A | | 1/1946 | De Reamer et al. | |
| 3,060,310 A | | 10/1962 | Bertsche, Jr. et al. | |
| 3,122,405 A | | 2/1964 | Pistey | |
| 3,263,201 A | | 7/1966 | Pistey | |
| 3,329,924 A | | 7/1967 | Henshaw, Jr. | |
| 3,344,390 A | | 9/1967 | Dell | |
| 3,727,040 A | | 4/1973 | Armstrong et al. | |
| 3,733,709 A | * | 5/1973 | Bassemir et al. | 34/277 |

(Continued)

FOREIGN PATENT DOCUMENTS

| | | |
|---|---|---|
| JP | 4-295801 | 10/1992 |
| JP | 11-97732 | 4/1999 |
| JP | 2001-296607 | 10/2001 |

OTHER PUBLICATIONS

Ronkese, B. J.; "Metal Wool and Indium Heat Sink," Aug. 1978, IBM Technical Disclosure Bulletin, vol. 21, No. 3, pp. 1143–1144.

"Dichroic filters, dichroic mirrors, dichroic cross prisms," *Optical Coatings Japan*, Oct. 3, 2002, TMAE, http://www . techmark.nl/ocj/dichroics.htm.

"UVTechnology Offers 100% Complete UV Cure Solutions Cool Cure Technology to the Flexo Market," *Mark Andy News Release*, Oct. 3, 2002, Mark Andy, Inc., http://www. markandy.com/news091202d.htm.

*Primary Examiner*—Alan Cariaso
(74) *Attorney, Agent, or Firm*—Foley & Lardner LLP

(57) ABSTRACT

A shutter apparatus for a curing lamp housing is provided. The shutter apparatus may be pulled out of the housing along ribs. The ribs slide with respect to recesses formed in rails of the shutter apparatus. When the shutter apparatus is pulled out of the housing, easy access to fasteners holding the shutters onto drive and pivot shafts enables the shutters to be readily replaced. A method detailing such replacement is also provided. A drive mechanism enables the shutters to be opened and closed in unison.

53 Claims, 12 Drawing Sheets

U.S. PATENT DOCUMENTS

| | | | | | |
|---|---|---|---|---|---|
| 3,783,261 | A | | 1/1974 | Hartmann | |
| 3,819,929 | A | * | 6/1974 | Newman | 250/504 R |
| 3,865,106 | A | | 2/1975 | Palush | |
| 3,900,727 | A | | 8/1975 | Hutz | |
| 3,967,385 | A | * | 7/1976 | Culbertson | 34/277 |
| 4,149,086 | A | | 4/1979 | Nath | |
| 4,422,100 | A | | 12/1983 | DuVall et al. | |
| 4,443,836 | A | * | 4/1984 | Horiuchi et al. | 362/321 |
| 4,563,589 | A | | 1/1986 | Scheffer | |
| 4,574,337 | A | | 3/1986 | Poppenheimer | |
| 4,604,680 | A | | 8/1986 | Levin et al. | |
| 4,644,899 | A | | 2/1987 | Glaus | |
| 5,177,396 | A | | 1/1993 | Gielen et al. | |
| 5,216,820 | A | | 6/1993 | Green et al. | |
| 5,339,226 | A | * | 8/1994 | Ishikawa | 362/282 |
| 5,355,198 | A | * | 10/1994 | Saito | 362/321 |
| 5,394,317 | A | | 2/1995 | Grenga et al. | |
| 5,414,601 | A | | 5/1995 | Davenport et al. | |
| 5,440,137 | A | | 8/1995 | Sowers | |
| 5,510,964 | A | | 4/1996 | Spitler et al. | |
| 5,552,927 | A | | 9/1996 | Wheatly et al. | |
| 5,723,937 | A | | 3/1998 | Whitman et al. | |
| 5,825,041 | A | | 10/1998 | Belek et al. | |
| 5,932,886 | A | | 8/1999 | Arai et al. | |
| 6,076,943 | A | * | 6/2000 | Lassovsky | 362/283 |
| 6,124,600 | A | | 9/2000 | Moroishi et al. | |
| 6,200,005 | B1 | | 3/2001 | Roberts et al. | |
| 6,474,837 | B1 | * | 11/2002 | Belliveau | 362/282 |
| 6,572,370 | B1 | | 6/2003 | Hampden | |
| 6,621,087 | B1 | | 9/2003 | Bisges et al. | |
| 6,646,278 | B1 | | 11/2003 | Schwarz et al. | |
| 6,719,444 | B1 | | 4/2004 | Alber et al. | |
| 6,720,566 | B1 | | 4/2004 | Blandford | |

* cited by examiner

SHUTTER APPARATUS, CURING LAMP HOUSING INCORPORATING SAME, AND METHOD OF SHUTTER REPLACEMENT

CROSS-REFERENCE TO RELATED APPLICATIONS

This application claims priority to U.S. Provisional Patent Application Ser. No. 60/418,193, filed on Oct. 15, 2002, the contents of which are hereby incorporated by reference.

BACKGROUND OF THE INVENTION

Description of the Related Art

FIG. 1 is a schematic view of a prior art lamp housing 10. The lamp housing 10 contains a lamp 26 (also called a "light source 26") which projects diverging light having a variety of wavelengths from the interior 24 of the lamp 26. Some of the light is directed toward a reflective mirror 16 which reflects the light toward a band-pass filter 20. In some prior art embodiments, the mirror 16 is planar (as shown), whereas in other prior art embodiments the mirror 16 is curved. However, in all prior art embodiments, at least some of the light reflected by the mirror 16 is redirected back toward the light source 26.

The purpose of a band-pass filter in an optical system is to reflect light in a specific range of wavelengths and to transmit light of a different set of wavelengths. A particular type of band-pass filter, often referred to as a "cold mirror," is used to provide good reflection of light having wavelengths in a particular range and to transmit light outside of that range. For example, one type of cold mirror reflects light having wavelengths between about 200 nm to about 450 mm (i.e., ultraviolet ("UV") light and the lower end of the visible light spectrum) and transmits light having wavelengths above about 450 nm, i.e., light which includes most visible light and infrared ("IR") light. Similarly, another type of band-pass filter, i.e., a hot mirror, transmits light having wavelengths between about 200 nm to about 450 nm (i.e., UV light and the lower end of the visible light spectrum) and reflects light having wavelengths above about 450 nm, i.e., light which includes most visible light and IR light.

Band-pass filters are used to separate light into usable and unusable light. For example, a cold mirror may be used to separate light into UV light and visible/IR light. The UV light may be reflected toward a material, such as an object or web 8, that is to be cured via a curing application. By way of contrast, the visible/IR light may be transmitted through the cold mirror (i.e., it is not directed toward the curing application at hand) to prevent unnecessary and unwanted heating of the materials that are to be cured.

The band-pass filter 20 is typically adapted to reflect light having wavelengths which fall within a specified range and to transmit light having wavelengths outside of that range. For example, in curing applications, if a cold mirror is used for the band-pass filter 20, it may reflect light having wavelengths between about 200 nm to about 450 nm (e.g., UV light) and transmit light outside of this range, including visible light and IR light. The light which is reflected by the cold mirror may pass through a protective window 22 and may be used in applications calling for a particular type of light, e.g., UV light. Similarly, if a hot mirror is used for the band-pass filter 20, it may transmit light having wavelengths between about 200 nm to about 450 nm (e.g., ultraviolet light) and reflect light outside of this range, including visible light and IR light.

As the remaining light (e.g. visible/IR) is transmitted through the band-pass filter, it may be necessary to protect people and/or items which may be harmed by exposure to this light. To address this concern, the light which is transmitted through the band-pass filter may pass through an air corridor 52 and into a solid heat sink 30, where it may be absorbed and converted into heat energy via radiant heat transfer.

Air, which is fed into the air corridor 52 via inlets 50, may be used to cool the heat sink 30. Similarly, air may be fed into the housing 10 via inlets 40. The air passing through the inlets 40 may be used to cool the light source 26, the mirror 16, and/or a set of reflective shutters 12. Further, the heat sink 30 may be designed so that its shape and cross-sectional area will allow the heat absorbed therein to be transferred to a stream of cooling air in the air corridor 52 via forced/induced convection.

Some of the light from the light source 26 is also reflected off the reflective surfaces ("shutters") 12 toward the band-pass filter 20. The purpose of shutters 12 in a UV curing system is to gather and direct the light emitted from the lamp 26 to a two (or three) dimensional plane(s) or object(s) 8 where UV curing will take place. The shutters 12 may also be closed to prevent (or at least greatly inhibit) the light (and heat associated therewith) emitted from a lamp 26 from reaching objects 8 where UV curing will take place.

The shutters 12, which have traditionally rotated on axes 14, have inside surfaces (i.e., on the side facing the light source) which are highly polished. As a result, when an object 8 (which may be in the form of a film or label) to be cured is moved across a window 22 in the housing 10, the shutters 12 may be opened and the polished surface of the shutters 12 used to gather and direct the light toward the band-pass filter 20.

The shutters 12 also serve a heat containment function. The temperature of the light source 26 may reach from about 650° C. to about 850° C. In some embodiments, as the light source 26 is reasonably close to the moving object 8, if the object 8 is stopped while the lamp housing 10 is emitting light, it may be preferable to protect the object 8 from the heat associated with the light emitted by light source 26 by closing the shutters 12.

The shutters 12 may be opened due to their being adapted to rotate on the axes 14. In a first position (not shown in FIG. 1), the distal ends 13 of the shutters 12 approach each other, thereby substantially containing the light emitted by light source 26. In a second position, shown in FIG. 1, the distal ends 13 of the shutters 12 are separated so that the light emitted by the light source 26 can be reflected toward the band-pass filter 20.

Previously, to move the shutters 12 from a non-shutter position (also referred to as a "closed position") to a shutter position (also referred to as an "open position"), the shutters 12 were rotated about the axes 14, such as by mechanically attaching the shutters 12 to a round drive shaft 15 (as shown in FIG. 2), which is driven by a motor (not shown) in the curing lamp housing 10. The shutter 12 contained a hole into which the shaft 15 was slid, pressed, heat fit, use of a set screw, etc. to attach the shutter 12 to the shaft 15. Further, this method of attaching the shutter 12 and the shaft 15 involved drilling into the shutter 12 and pinning the shaft 15 to it; this, however, is a time consuming operation. The shaft 15, in turn, was passed through or laid upon a surface(s) to support the shutter 12 in both static and dynamic conditions.

When the shutter 12 had to be serviced or replaced, the mechanical attachment of the shutter 12 to the shaft 15 had to be removed or disengaged. For example, if the shutter 12 and shaft 15 had been drilled and pinned, the pin 17 had to be driven out, before the shaft 15 and shutter 12 could be removed; this operation often damaged the hole in the shutter 12 to the point where it could not be reused. Similarly, if the shaft 15 has been pressed into and through a hole in the shutter 12, the shaft 15 had to be pressed back out of the shutter 12 in order for the shutter 12 to be removed. Further, if the shaft 15 had been heat fit into the shutter 12, some thermal or mechanical method had to be used to remove the shaft 15 from the shutter 12. In all these removal/disengagement methods, there existed a possibility that some of the mechanical dimensions (e.g., shape, fit, etc.) of the shaft 15 and/or the shutter 12 would change as a result of the stress (mechanical and/or thermal) which the removal/disengagement process caused.

Accordingly, what is needed is a new method and apparatus which: (a) may mechanically attach a drive shaft to the shutter; (b) may provide for easy field replacement of the shutters without inducing the aforementioned mechanical stress; and/or (c) may reduce the downtime of a curing lamp housing while a shutter is being replaced.

SUMMARY OF THE INVENTION

The invention herein contains multiple embodiments including a shutter apparatus for a curing lamp housing. The apparatus includes (a) a shutter having a reflective surface and an attachment surface; (b) a drive shaft connected to the shutter along the attachment surface by at least one fastener; and (c) a drive mechanism adapted to cause the shutter to rotate between an open position and a closed position. The at least one fastener passes through the drive shaft in a direction which is not parallel to an axis of rotation of the drive shaft. In addition, the at least one fastener passes through the attachment surface.

In a further embodiment of the shutter apparatus, the apparatus may additionally include a shaft connector having two boss portions. A first of the boss portions may be connected to the drive shaft and may be adapted to rotate in a pivot housing so that the shutter will rotate. In addition, a second of the boss portions may be connected to the drive mechanism.

In another further embodiment of the shutter apparatus, the drive shaft may be connected to the shutter along the attachment surface by at least two first fasteners.

In another further embodiment of the shutter apparatus, the drive shaft may be connected to the shutter along the attachment surface by at least two first fasteners wherein the fasteners are male threaded screws, and wherein the male threaded screws are received by female threaded bores formed in the attachment surface of the shutter.

In another further embodiment of the shutter apparatus, the drive shaft may have a non-circular cross section such as, for example, a rectangular shaped cross section.

In a further embodiment of the shutter apparatus, the drive mechanism may include an air cylinder and a shutter spring having at least one spring arm comprising a receptor. Further, the apparatus may also include a shaft connector having two boss portions. A first of the boss portions may be connected to the drive shaft and may be adapted to rotate in a pivot housing so that the shutter will rotate. In addition, a second of the boss portions may be connected to the drive mechanism. Further, the second boss may be received by the receptor of the at least one spring arm.

In a further embodiment, the drive mechanism may also include a strain reduction plate provided between the air cylinder and the shutter spring. As a result, when the air cylinder raises and lowers the shutter spring, the strain reduction plate may reduce strain experienced by the shutter spring.

In another further embodiment, the drive mechanism may also include a leaf spring provided on a side of the shutter spring opposite the strain reduction plate. Further, the air cylinder may be adapted to raise and lower the shutter spring and the strain reduction plate and the leaf spring may be adapted to reduce strain experienced by the shutter spring when the shutter spring is raised and lowered.

In a further embodiment, when the shutter spring is lowered, the spring arm may elastically bend in a first spring direction thereby forcing the shaft connector and the shutter to rotate in a first rotation direction along the axis of rotation of the drive shaft. Similarly, when the shutter spring is raised, the spring arm may elastically bend in a second spring direction thereby forcing the shaft connector and the shutter to rotate in a second rotation direction along the axis of rotation of the drive shaft. The first spring direction may be opposite the second spring direction and the first rotation direction may be opposite the second rotation direction.

In another further embodiment of the shutter apparatus, the apparatus may also include a bearing having a hole therein though which the drive shaft is journalled such that a back portion of the drive shaft projects from the bearing. Further, the bearing may be adapted to rotate in a pivot housing so that the shutter will rotate.

In another further embodiment of the shutter apparatus, the apparatus may also include a bearing having a hole therein though which the drive shaft is journalled such that a back portion of the drive shaft projects from the bearing and a shaft connector engaged to back portion of the drive shaft. Further, the bearing may be adapted to rotate in a pivot housing so that the shutter will rotate and a second boss of the shaft connector may be connected to the drive mechanism.

In another embodiment, the drive mechanism may include an air cylinder and a shutter spring having at least one spring arm comprising a receptor. Further, the second boss is received by the receptor of the at least one spring arm.

In another embodiment, the drive mechanism may include: (a) an air cylinder; (b) a shutter spring having at least one spring arm comprising a receptor; and (c) a strain reduction plate provided between the air cylinder and the shutter spring. Further, the second boss is received by the receptor of the at least one spring arm.

In a further embodiment, the air cylinder may be adapted to raise and lower the shutter spring. In addition, the strain reduction plate may be adapted to reduce strain experienced by the shutter spring when the shutter spring is raised and lowered.

In another further embodiment, the air cylinder may be adapted to raise and lower the shutter spring such that when the shutter spring is lowered, the spring arm will elastically bend in a first spring direction thereby forcing the shaft connector and the shutter to rotate in a first rotation direction along the axis of rotation of the drive shaft. Further, when the shutter spring is raised, the spring arm will elastically bend in a second spring direction thereby forcing the shaft connector and the shutter to rotate in a second rotation direction along the axis of rotation of the drive shaft. The first spring direction may be opposite the second spring direction and the first rotation direction may be opposite the second rotation direction.

The invention also contemplates a shutter apparatus for a curing lamp housing, the apparatus including: (a) first and second shutters, each having a reflective surface and an attachment surface; (b) a first drive shaft connected to the first shutter along the attachment surface thereof by at least one fastener, the at least one fastener passing through the first drive shaft and the attachment surface in a direction which is not parallel to an axis of rotation of the first drive shaft; (c) a second drive shaft connected to the second shutter along the attachment surface thereof by at least one fastener, the at least one fastener passing through the second drive shaft and the attachment surface in a direction which is not parallel to an axis of rotation of the second drive shaft; and (d) a drive mechanism adapted to cause the shutters to rotate substantially in unison between an open position and a closed position.

In a further embodiment, the drive mechanism may include an air cylinder and a shutter spring having first and second spring arms each comprising a receptor.

In another further embodiment, the apparatus may also include: (e) a first shaft connector having two boss portions, wherein a first of the boss portions is connected to the first drive shaft and is adapted to rotate in a first pivot housing so that the first shutter will rotate, and wherein a second of the boss portions is connected to the receptor of the first spring arm; and (f) a second shaft connector having two boss portions, wherein a first of the boss portions is connected to the second drive shaft and is adapted to rotate in a second pivot housing so that the second shutter will rotate, and wherein a second of the boss portions is connected to the receptor of the second spring arm. In a further embodiment, the air cylinder may be adapted to raise and lower the shutter spring and the strain reduction plate may be adapted to reduce strain experienced by the shutter spring when the shutter spring is raised and lowered.

In another further embodiment, the drive mechanism may include: (a) an air cylinder; (b) a shutter spring having first and second spring arms each comprising a receptor; and (c) a strain reduction plate provided between the air cylinder and the shutter spring. In addition, the air cylinder may be adapted to raise and lower the shutter spring.

In another further embodiment, the drive mechanism may also include a leaf spring provided on a side of the shutter spring opposite the strain reduction plate. Further, the air cylinder may be adapted to raise and lower the shutter spring and the strain reduction plate and the leaf spring may be adapted to reduce strain experienced by the shutter spring when the shutter spring is raised and lowered.

In a further embodiment, when the shutter spring is lowered, the spring arms will elastically bend, substantially in unison, either toward or away from each other thereby forcing the first and second shaft connectors to rotate, and wherein the rotation of the first and second shaft connectors forces the first and second shutters to rotate either toward or away from each other along the axes of rotation of the first and second drive shafts.

In a further embodiment, when the shutter spring is raised, the spring arms will elastically bend, substantially in unison, in the other of either toward or away from each other thereby forcing the first and second shaft connectors to rotate, and wherein the rotation of the first and second shaft connectors forces the first and second shutters to rotate in the other of either toward or away from each other along the axes of rotation of the first and second drive shafts.

In another embodiment of the shutter apparatus, the apparatus may also include: (e) a first mount rail provided substantially parallel to the first shutter; and (f) a second mount rail provided substantially parallel to the second shutter. In addition, the first and second mount rails may be adapted to enable the shutter apparatus to be pushed into and/or pulled out of a curing lamp housing as an integral unit.

In a further embodiment, each of the mount rails may have a recess formed therein. Further, the recesses may be adapted to receive correspondingly sized ribs projecting from inner walls of the curing lamp housing.

The invention also contemplates a curing lamp apparatus including: (a) a light source adapted to radiate light; and (b) a shutter apparatus adapted to trap a substantial portion of the light radiated by the light source, the apparatus including: (i) a first shutter having a reflective surface and an attachment surface; (ii) a first drive shaft connected to the first shutter along the attachment surface by at least one fastener, the at least one fastener passing through the first drive shaft and the attachment surface in a direction which is not parallel to an axis of rotation of the first drive shaft; (iii) a drive mechanism; and (iv) a first shaft connector having two boss portions, wherein a first of the boss portions is connected to the first drive shaft and is adapted to rotate in a pivot housing so that the first shutter will rotate, and wherein a second of the boss portions is connected to the drive mechanism.

In a further embodiment of the curing lamp apparatus, the drive mechanism may include an air cylinder and a shutter spring having first and second spring arms each comprising a receptor. Further, the second of the boss portions of the first shaft connector may be connected to the receptor of the first spring arm.

In another further embodiment, the drive mechanism may also include a leaf spring provided on a side of the shutter spring opposite the strain reduction plate. Further, the air cylinder may be adapted to raise and lower the shutter spring and the strain reduction plate and the leaf spring may bc adapted to reduce strain experienced by the shutter spring when the shutter spring is raised and lowered.

In a further embodiment, the shutter apparatus may also include (v) a second shutter connected to a second drive shaft along an attachment surface by at least one fastener, the at least one fastener passing through the second drive shaft in a direction which is not parallel to an axis of rotation of the second drive shaft; (vi) a second shaft connector having two boss portions, wherein a first of the boss portions is connected to the second drive shaft and is adapted to rotate in a second pivot housing so that the second shutter will rotate, and wherein a second of the boss portions is connected to the receptor of the second spring arm.

In another further embodiment, the drive mechanism may also include a strain reduction plate provided between the air cylinder and the shutter spring. Further, the strain reduction plate may be adapted to reduce strain experienced by the shutter spring when the shutter spring is raised and lowered.

In a further embodiment, when the shutter spring is lowered, the spring arms will elastically bend, substantially in unison, either toward or away from each other thereby forcing the first and second shaft connectors to rotate, and wherein the rotation of the first and second shaft connectors forces the first and second shutters to rotate either toward or away from each other along the axes of rotation of the first and second drive shafts. Similarly, when the shutter spring is raised, the spring arms will elastically bend, substantially in unison, in the other of either toward or away from each other thereby forcing the first and second shaft connectors to rotate, and wherein the rotation of the first and second shaft connectors forces the first and second shutters to rotate in the other of either toward or away from each other along the axes of rotation of the first and second drive shafts.

In another embodiment of the curing lamp, the light radiated by the light source may have a plurality of wavelengths including light having a wavelength in a first range and a wavelength outside of the first range. In addition, the lamp apparatus is located within a housing comprising a band-pass filter. The band-pass filter may be positioned in the path of at least some of the light which the light source is adapted to radiate. Further, the band-pass filter may be adapted to reflect light having wavelengths in the first range and to transmit light having wavelengths outside of said first range.

In a further embodiment, the housing may also comprise a heat sink. Further, the band-pass filter may be positioned between the light source and the heat sink.

In another embodiment, the band-pass filter may be a cold mirror or a hot mirror.

The invention also contemplates a method of replacing shutters in a curing lamp housing. The method includes the steps of: (a) removing a used shutter apparatus at least partially out of a curing lamp housing, the used shutter apparatus comprising at least one used shutter and a drive mechanism adapted to rotate said used shutter between an open position in which light emitted by a light source in the curing lamp housing is radiated out of the housing and a closed position in which the light emitted by the light source is substantially contained within the shutter apparatus; (b) removing at least one fastener connecting the used shutter to a drive shaft, wherein the at least one fastener passes through the drive shaft in a direction which is not parallel to an axis of rotation of the drive shaft; (c) replacing the used shutter with a new shutter; (d) fastening the new shutter to the drive shaft by means of the at least one fastener to create a new shutter apparatus; and (e) returning the new shutter apparatus into the curing lamp housing.

In a further embodiment of the method, the step of pulling the used shutter apparatus out of the curing lamp housing may include sliding mount rails of the used assembly along ribs formed in the curing lamp housing. In addition, in a further embodiment, the mount rails may comprise recesses which are sized to receive the ribs formed in the curing lamp housing.

These and other features, aspects, and advantages of the present invention will become more apparent from the following description, appended claims, and accompanying exemplary embodiments shown in the drawings.

BRIEF DESCRIPTION OF THE DRAWINGS

The accompanying drawings, which are incorporated in and constitute a part of the specification, illustrate an embodiment of the invention and together with the description, serve to explain the principles of the invention.

DETAILED DESCRIPTION

Figure 1:
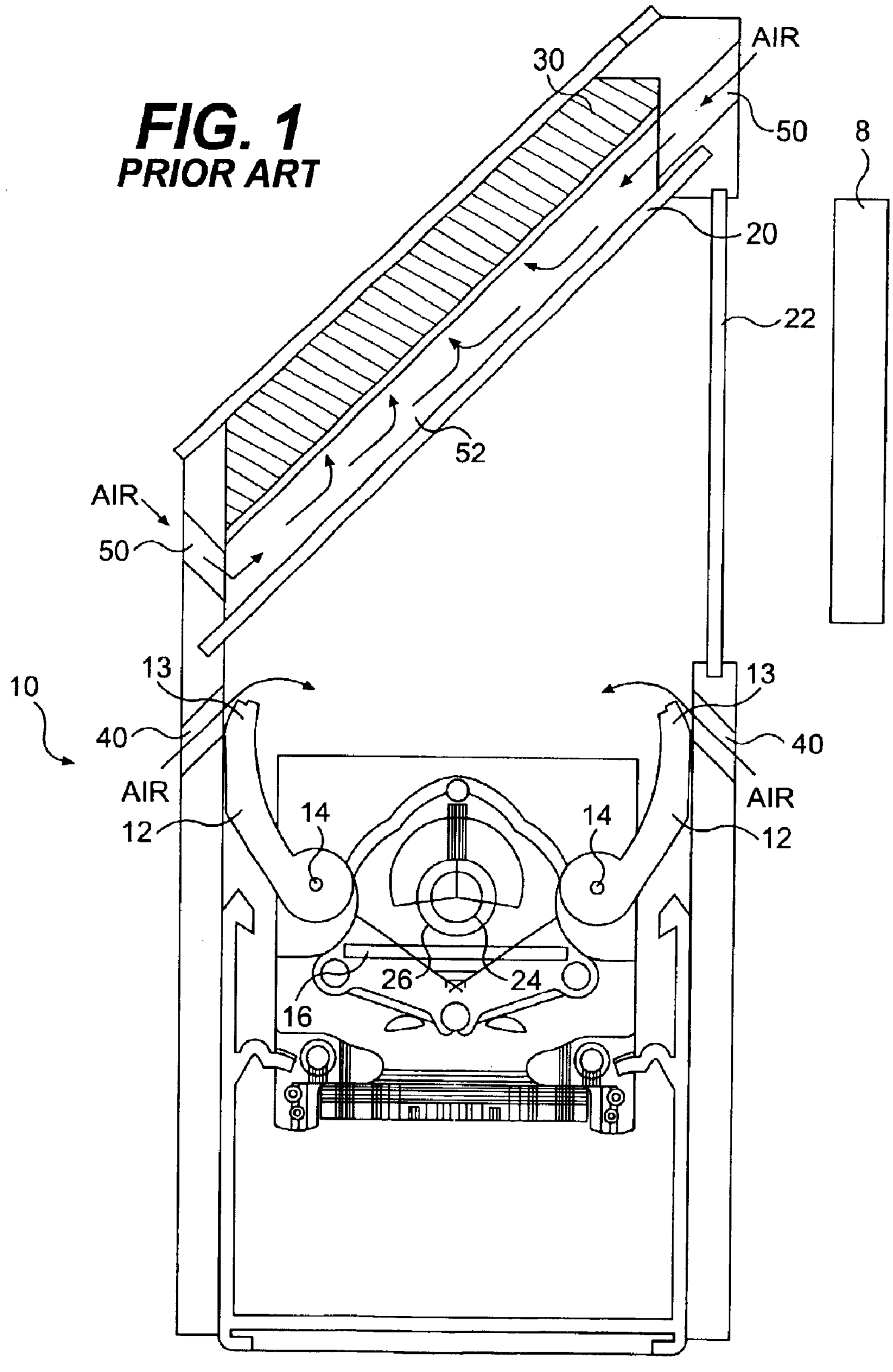
FIG. 1 PRIOR ART
FIG. 1 is a schematic view of a prior art lamp housing.
Figure 2:
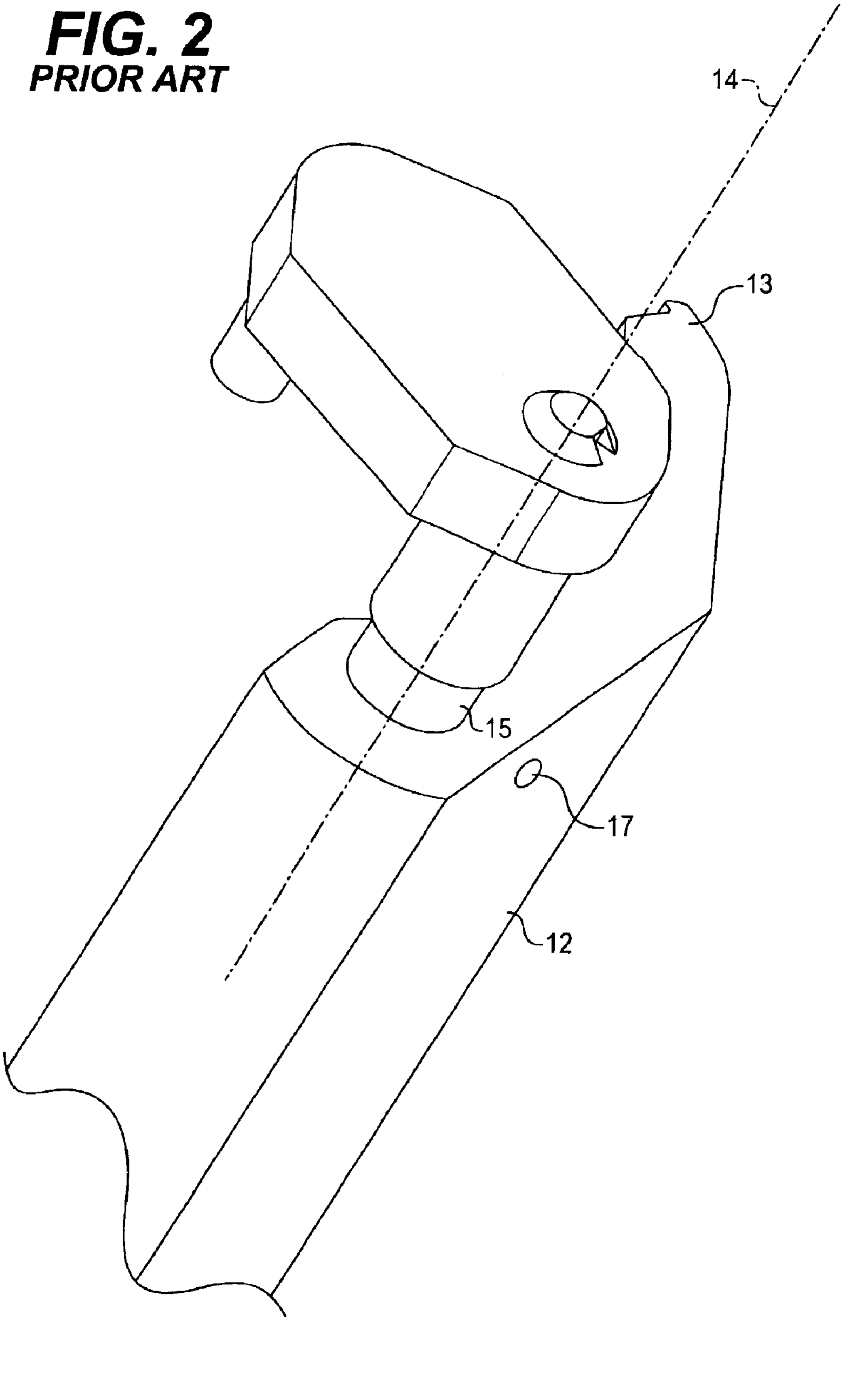
FIG. 2 PRIOR ART
FIG. 2 is a perspective view of a prior art shutter, drive shaft, and shaft connector.

Reference will now be made in detail to presently preferred embodiments of the invention, which are illustrated in the drawings. An effort has been made to use the same reference numbers throughout the drawings to refer to the same or like parts.

Figure 3:
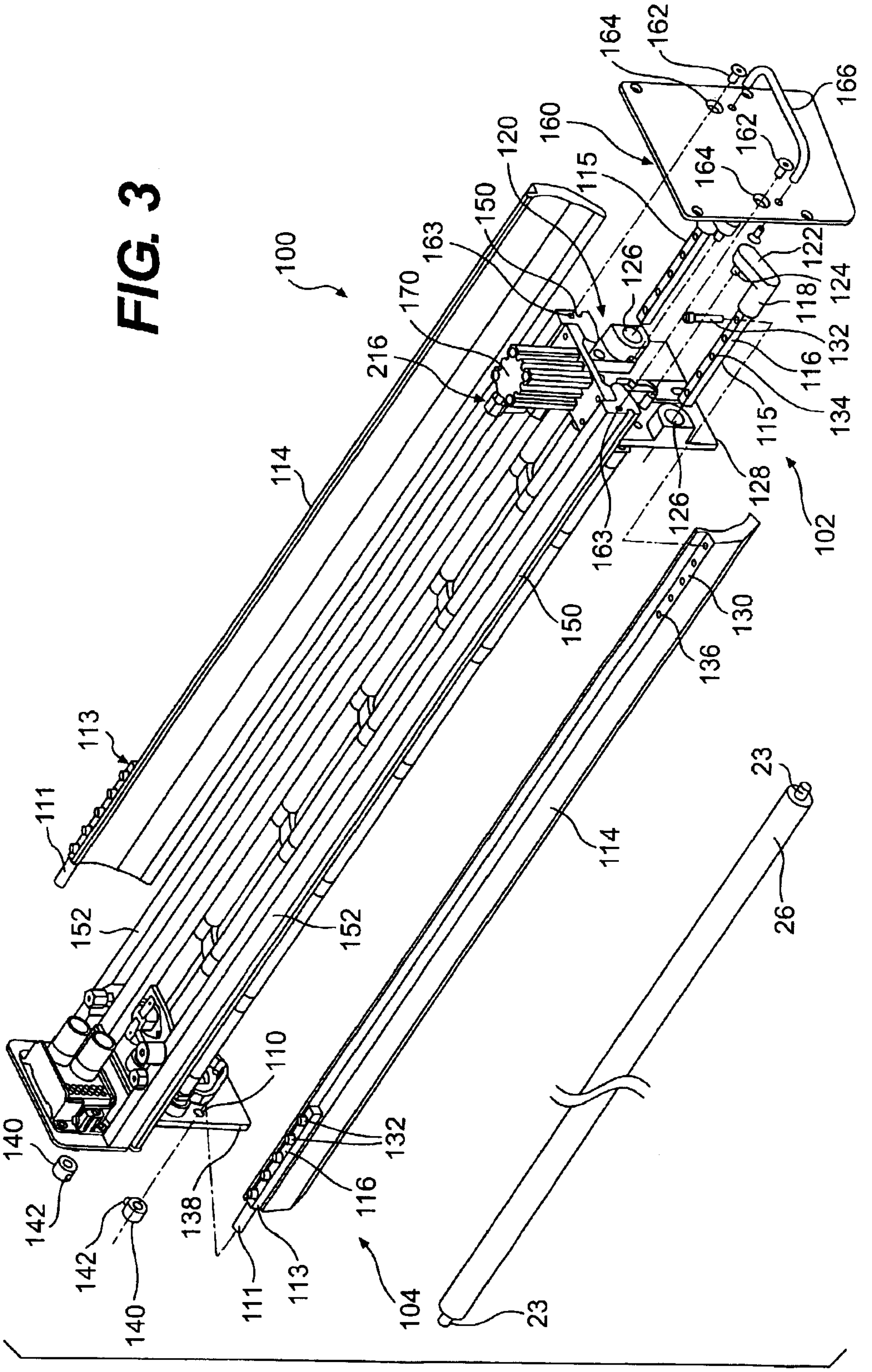
FIG. 3 is an exploded view of a shutter apparatus including two shutters, a drive mechanism, and a lamp.
Figure 4B:
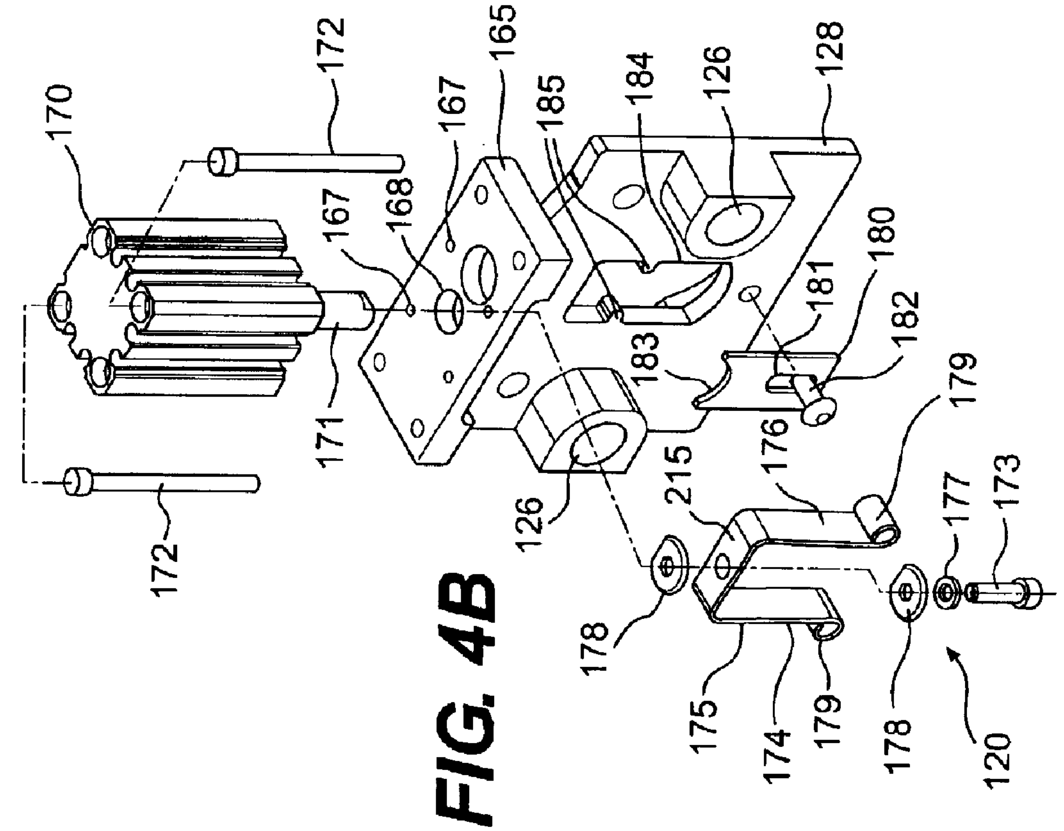
FIG. 4B is an exploded view of a drive end support including the drive mechanism of FIG. 3.

FIG. 3 shows an exploded view of a shutter apparatus 100 including two shutters 114, a shutter actuator 120 (also called a "drive mechanism 120"), and a lamp 26. As shown in FIG. 4B, the drive mechanism 120 includes an air cylinder 170, at least one strain reduction plate 178 (which may be in the form of a washer), and a shutter spring 174. The strain reduction plate 178 is adapted to reduce strain experienced by the shutter spring 174 when the shutter spring 174 is raised and lowered, as later described in detail.

The lower strain reduction plate 178 shown in FIG. 3 may be replaced by a leaf spring 278 (shown in FIGS. 7 and 8), particularly if the shutter apparatus 100 is to be used at high cycle rates of opening and closing the shutters 114. These high cycle rates may occur when a press operator, when setting up a print job, jogs a press using the shutter apparatus 100. As a result of the shape of the leaf spring 278, a portion of the loading of the shutter spring 174 is distributed into the leaf spring 278. This redistribution of the loading may greatly improve the fatigue life of the shutter spring 174.

To assemble the drive mechanism 120, a piston 171 of the air cylinder 170 is journalled through a bore 168 in a top plate 165 of the right endplate 128. The piston is then journalled through: (a) a bore in a strain reduction plate 178, which may have one side thereof flattened to enable the strain reduction plate 178 to be positioned closer to the endplate 128; (b) a bore in the shutter spring 174; and, optionally, (c) through a bore in a second strain reduction plate 178 or leaf spring 278. The strain reduction plate 178 (and additional strain reduction plate 178 or leaf spring 278, if one is provided) and the shutter spring 174 are immobilized with respect to the piston 171 by means of a fastener 173 which engages the piston 171. In addition, a washer 177 may be used in conjunction with the fastener 173 to enhance the engagement between the fastener 173 and the piston 171.

After the air cylinder 170 is affixed to the shutter spring 174, the air cylinder 170 is immobilized with respect to the top plate 165 by fasteners 172 which pass through bores in the air cylinder 170 and are received by holes 167 in the top plate 165. Preferably, the fasteners 172 will be male threaded and the holes 167 will be complementarily female threaded. The air cylinder 170 is connected via a pneumatic fitting 216 (shown in FIG. 3) to a controller (not shown).

When the drive mechanism 120 is fully assembled, a lamp keeper 180 having a wide clearance slot 181 may be affixed to the right endplate 128 by means of a fastener 182. The lamp keeper 180 has a concavely curved upper side 183 which is adapted to receive a curved connective end portion 23 of a lamp 26. The clearance slot 181 enables the lamp 26 to be clamped so that its axis is centered between projections 185 formed in a window 184.

Figure 4A:
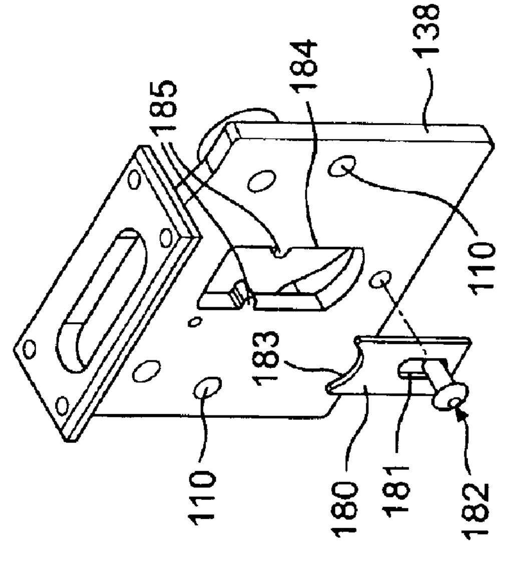
FIG. 4A is an exploded view of gear end support.

It should be readily noted that the left endplate 138, as shown in FIG. 4A, has a corresponding window 184 and a corresponding lamp keeper 180 so that the axis of the lamp 26 at the gear end 104 of shutter apparatus 100 can be similarly centered with respect to similar projections 185 formed in the left endplate 138. After the drive mechanism 120 and lamp keepers 180 are assembled, the shutters 114 can be attached by means of shutter drive shafts 115 and pivot shafts 113, as later described in detail.

One embodiment of invention described herein provides a non-circular shutter drive shaft 115. The shape of the cross-section of the drive shaft 115 can vary, e.g., the cross-section could be generally round but with a flat engagement surface(s) or a multi-sided polygon. Preferably, however, an attachment portion 116 of the shutter drive shaft 115 has a generally rectangular (e.g., square) cross-section whereas as bearing portion 118 (also referred to as a "first boss 118") has a substantially circular cross section.

The first boss 118 forms part of shaft connector 122; a second boss 124 of the shaft connector 122 is adapted to engage the drive mechanism 120, as later described in detail. In addition, the attachment portion 116 and the shaft connector 122 (including the first boss 118 and second boss 124) may be integrally formed or formed of separate parts joined together. Further, a preferred choice of materials for the drive shaft 115 and the shaft connector 122 is stainless steel.

Figure 5A:
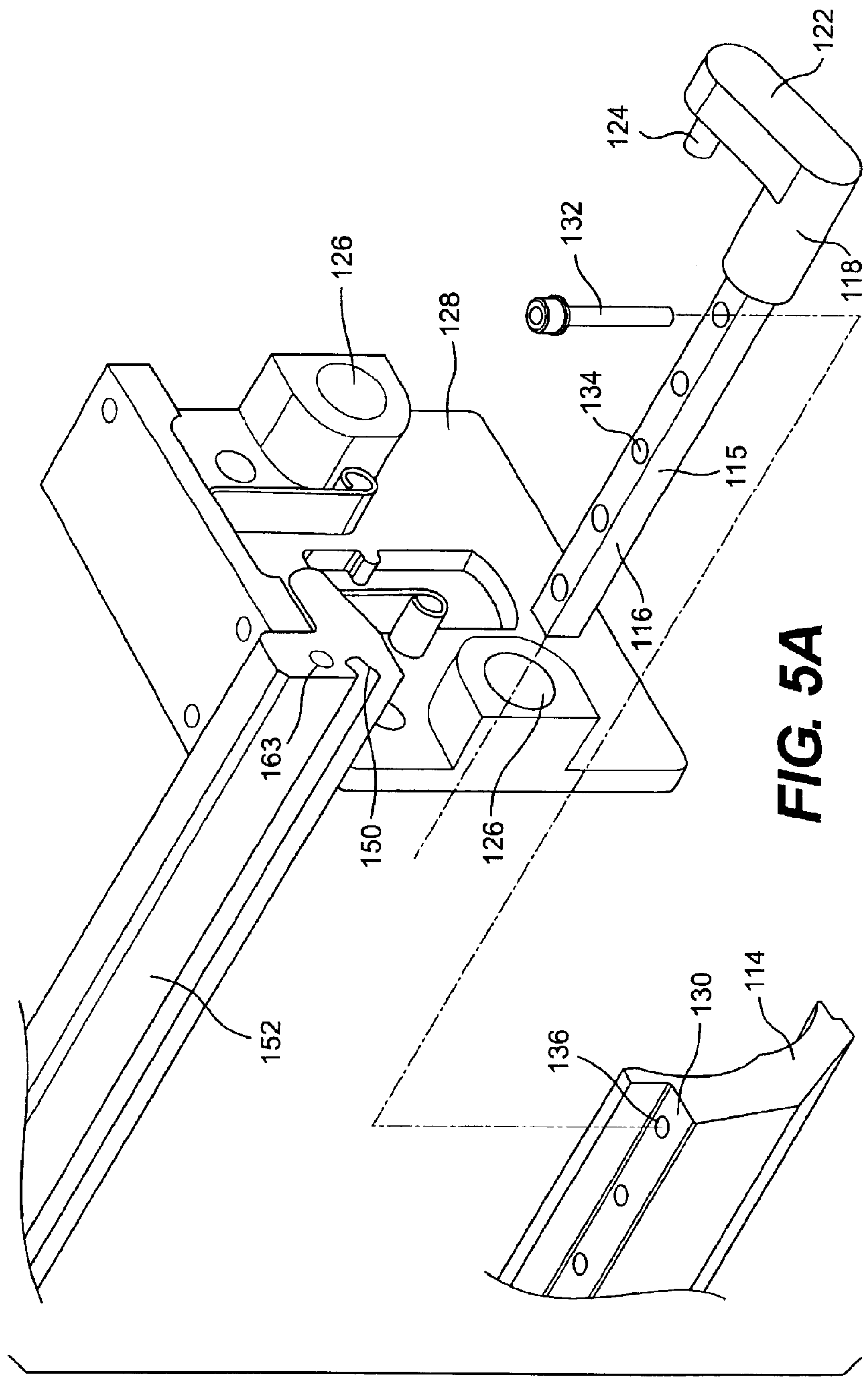
FIG. 5A is an exploded view of one of the shutters and the drive mechanism of FIG. 3, along with a drive shaft.

The attachment of the drive shafts 115 to the shutters 114 will be understood with respect to FIGS. 3 and 5A/5B. With respect to the drive end 102 of the shutter apparatus 100, each drive shaft 15 is journalled through a pivot housing 126, which is in the shape of a circular bore, in the right endplate 128. The diameter of the pivot housing 126 is preferably slightly (e.g., about 0.003") larger than the diameter of the first boss 118. As a result, when fully journalled, the first boss 118 of the shaft connector 122 will be substantially housed within the pivot housing 126 and will be adapted to rotate therein.

Simultaneous with the journalling of the first boss 118 in the pivot housing 126, the second boss 124 of the shaft connector 122 is journalled into a receptor (which is preferably in the form of a loop) 179 formed at the bottom of a spring arm 175, 176 of the shutter spring 174. To enable the second boss 124 to be received by, and rotate with respect to, the receptor 179, the spring arm 175, 176 may be bent elastically inward or outward to enable the second boss 124 to be received by the receptor 179. In addition, the receptor 179 preferably has a diameter which is greater than the diameter of the second boss 124 to provide clearance therebetween. Preferably, the diameter of the second boss 124 is about 0.187" and the diameter of the receptor is about 0.190". Accordingly, the clearance between the second boss 124 and the receptor 179 is about 0.003"; the purpose of this clearance will later be described in detail.

It should be recognized that the shaft connector 122 and the spring arm 175, 176 form a two-bar linkage. In addition, as one of the ends of the two-bar linkage is fixed (i.e., the end defined by the axis of rotation in the pivot housing 126) and as the other end is substantially fixed (i.e., it moves vertically with the top portion 215 (shown in FIG. 7) of the shutter spring 174 when raised and lowered by the air cylinder 170, as later described in detail), the clearance provided in the receptor 179 enables the spring arm 175, 176 to bend elastically at the top portion 215, when the shaft connector 122 rotates. Absent the preferred clearance, the spring arms 175, 176 may buckle when the top portion 215 of the shutter spring 174 is raised/lowered by the air cylinder 170.

Figure 5B:
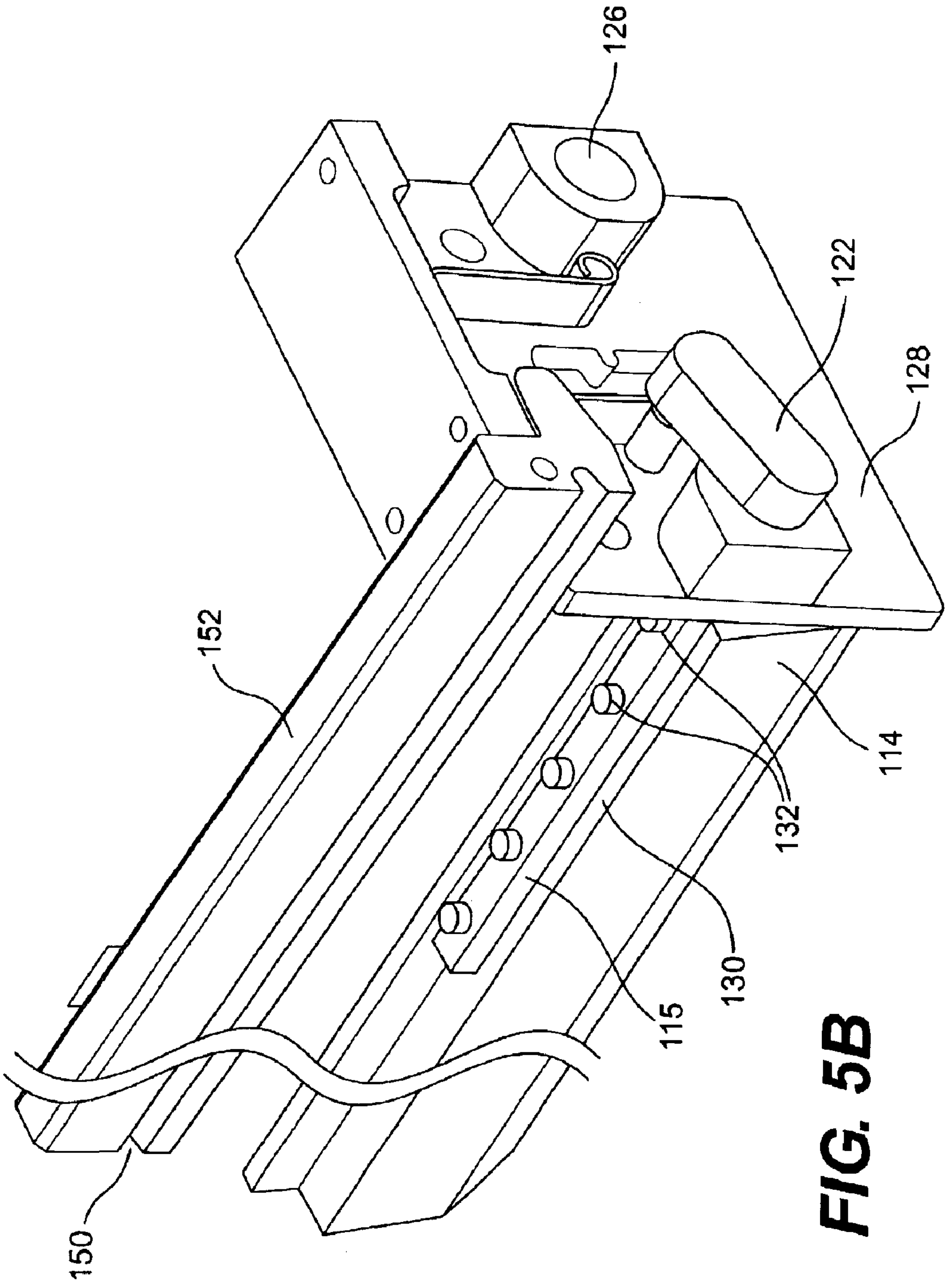
FIG. 5B is an assembled view of the various parts of FIG. 5A.

When the first and second bosses 118, 124 are received by the pivot housing 126 and the receptor 179 of the pivot spring 174, respectively, the attachment portion 116 of the driver shaft will be exposed behind the right endplate 128, as shown in FIG. 5B. The attachment portion 116 is preferably sized to rest on an attachment surface 130 of a shutter 114. Further, the attachment portion 116 preferably has a plurality of fastener holes 134 therein which are sized to receive a fastener 132. Similarly, the attachment surface 130 of the shutter 114 has a plurality of bores 136 therein. Preferably, the bores 136 will have female threading formed therein which is sized to engage male threading on the outer surface of the fasteners 132.

On the gear end 104 of the shutter apparatus 100, an arrangement similar in certain respects to the arrangement at the drive end 102 is employed. Specifically, pivot shafts 113 are designed to engage with the shutters 114 by means of attachment portions 116 which are substantially similar to the attachment portions 116 of the drive shafts 115. Further, like the drive shafts 115, the pivot shafts 113 are attached to the shutters 114 along the attachment surface 130 by means of a plurality of fasteners 132. However, whereas the drive shafts have a first boss 118 forming part of a shaft connector 122, the pivot shifts 113 have pivot pins 111 which are adapted to rotate in similarly sized holes 110 formed in the left endplate 138.

Caps 140 may be provided to maintain the pivot pins 111 in the holes 110. The caps 140 have set screws 142 which may be tightened to immobilize the caps 140 with respect to their respective pivot pins 111.

In sum, after the drive shaft 115 is journalled through the pivot housing 126, the drive shaft 115 may be affixed to the shutter 114 along the attachment surface 130 by means of a plurality of fasteners 132 journalled through the holes 134 in the attachment portion 116 and screwed into the bores 136 formed in the shutters 114. In addition, as a result of the overall length of the shaft connector 122, the drive shaft 115 will be locked in the pivot housing 126 by means of the shutter 114 on one end thereof and the shaft connector 122 on the opposite end thereof.

To lock the gear side end of the shutter 114, the pivot pins 111 of the pivot shafts 113 are journalled through the bores 110 in the left endplate 138. Fasteners 132 are then journalled through holes (not shown) in pivot shafts 113 and screwed into bores (not shown) in gear side end of the shutter 114 in the same manner as affixing the drive shafts 115 to the shutters 114. Finally, the caps 140 may be slid over the pivot pins 111 and the set screws 142 may be tightened so as to fix the location of the caps 140 on the pins 111.

Figure 6:
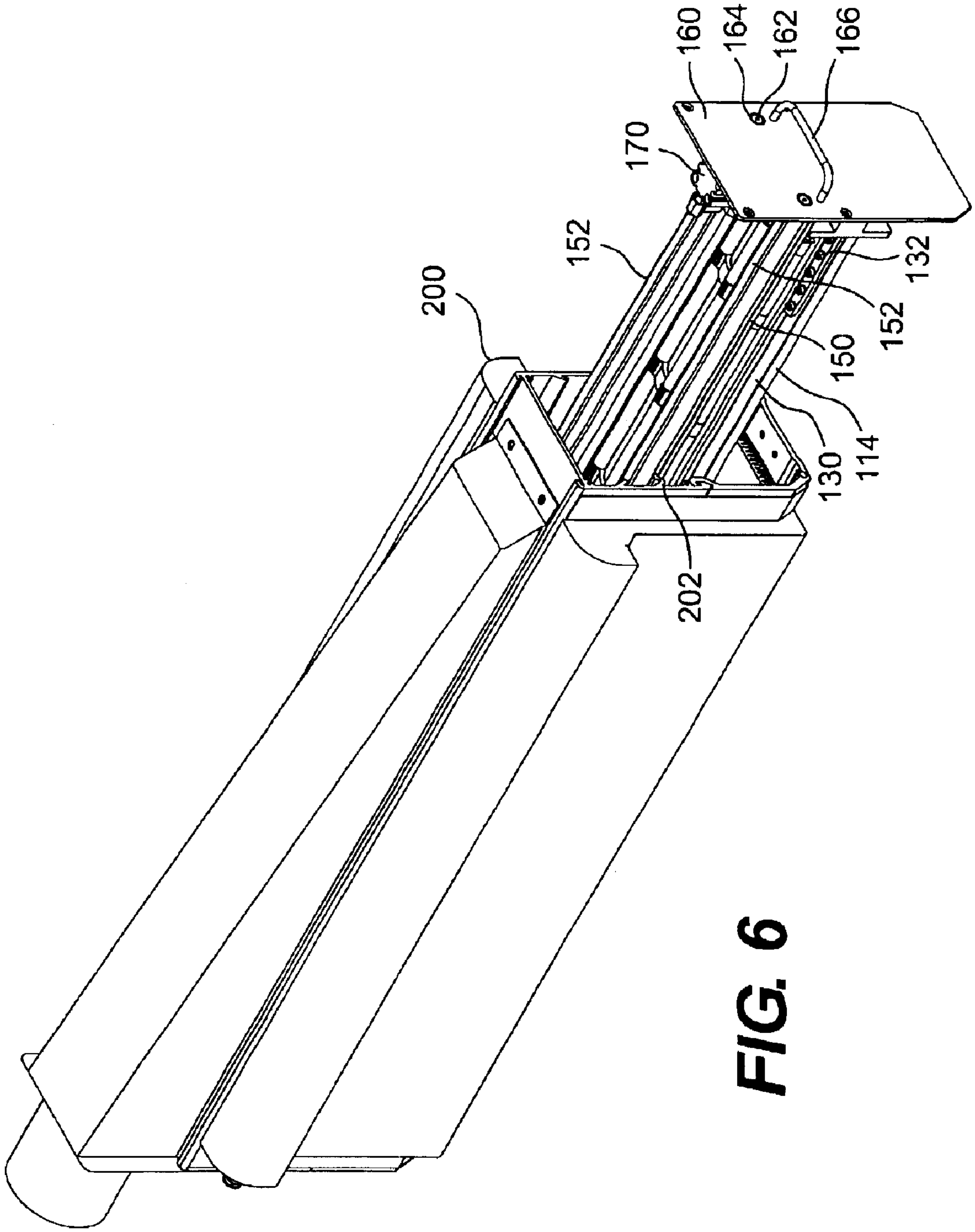
FIG. 6 shows a perspective view of the shutter apparatus of FIG. 3 partially exposed from a curing lamp housing, recess portions of mount rails of the shutter apparatus are engaged with ribs formed on an inner surface of the curing lamp housing.

With respect to FIG. 3, after the shutters 114 are affixed to their respective drive shafts 115 and pivot shafts 113, a cover plate 160 may be affixed to the shutter apparatus 110 by passing fasteners 162 through holes 164 in the cover plate 160 and screwing them into corresponding bores 163 formed in the ends of mount rails 152 which are substantially parallel to the shutters 114. Each of the mount rails 152 preferably has a recess 150 formed therein sized to receive a rib 202 projecting from the inner surface of a curing lamp housing 200, as shown in FIG. 6. Further, by incorporating a handle 166 onto the cover plate 160, the shutter apparatus 110 may be pulled out of the curing lamp housing 200, as an integral unit, along the ribs 202.

FIG. 6 shows a perspective view of the shutter apparatus 100 of FIG. 3 partially withdrawn from a curing lamp housing 200. The apparatus 100 is held in the housing 200 by engagement between the ribs 202 and the recesses 150. Specifically, ribs 202 projecting from the inner wall of the housing 200 are received by the recess portions 150 of the mount rails 152 of the shutter apparatus 100. As a result, the shutter apparatus 100 can be pulled out of (and pushed into) the housing 200 by aligning the ribs 202 with the recesses 150 and sliding the shutter apparatus 100 along the ribs 202. Further, this process is enhanced by means of a handle 162 attached to the cover plate 160, as shown.

When one or more shutters 114 needs to be replaced, the operator can pull the shutter apparatus 100 out of the housing 200 by means of the handle, the apparatus 100 sliding along the ribs 202. By sliding the apparatus 100 out of the housing 200, the operator will have access to the drive shafts 115 and pivot shafts 113. Accordingly, the fasteners 132 which connect the drive and pivot shafts 115, 113 to the shutters 114 can be readily removed and the shutters 114 easily replaced.

It should be readily apparent that the access afforded to the operator greatly improves over the prior art. Whereas the prior art connection between the drive shaft 15 and the shutter 12 could become problematic (e.g., the threads of a fastener joining the drive shaft 15 to the shutter 12 could be worn thereby preventing, or at least greatly inhibiting disengagement of the shaft 15 and the shutter 12), the current invention provides enhanced access to the fasteners 132 and improved disengagement thereof.

In the prior art, the weight of a shutter 12 was directed perpendicularly to the axis of rotation of the fastener holding the shaft 15 to the shutter 12; this orientation put strain on the fastener and, therefore, contributed to a wearing of the fastener and/or shutter 12 when disengaging the shutter 12 and the shaft 15. By way of contrast, as the fasteners 132 of the invention described herein are oriented substantially parallel to the direction in which weight of the shutters 114 is applied to the fasteners 132, the strain concerns of the prior art are eliminated (or at least substantially reduced), thereby facilitating the ease by which the fasteners 132 can be removed.

It also should be recognized that downtime of a curing lamp housing 200 can be drastically reduced by way of the present invention. By having a reserve shutter apparatus 100 available, when the shutters 114 of an in-use shutter apparatus 100 need to be replaced, the entire shutter apparatus 100 may be removed from the housing 200 (by sliding along the ribs 202) and the reserve apparatus 100 immediately inserted into the housing 200. At this point, the shutters 114 of the used apparatus 100 can be replaced while the curing lamp housing 200 is operating with the reserve shutter apparatus 100.

Figure 7:
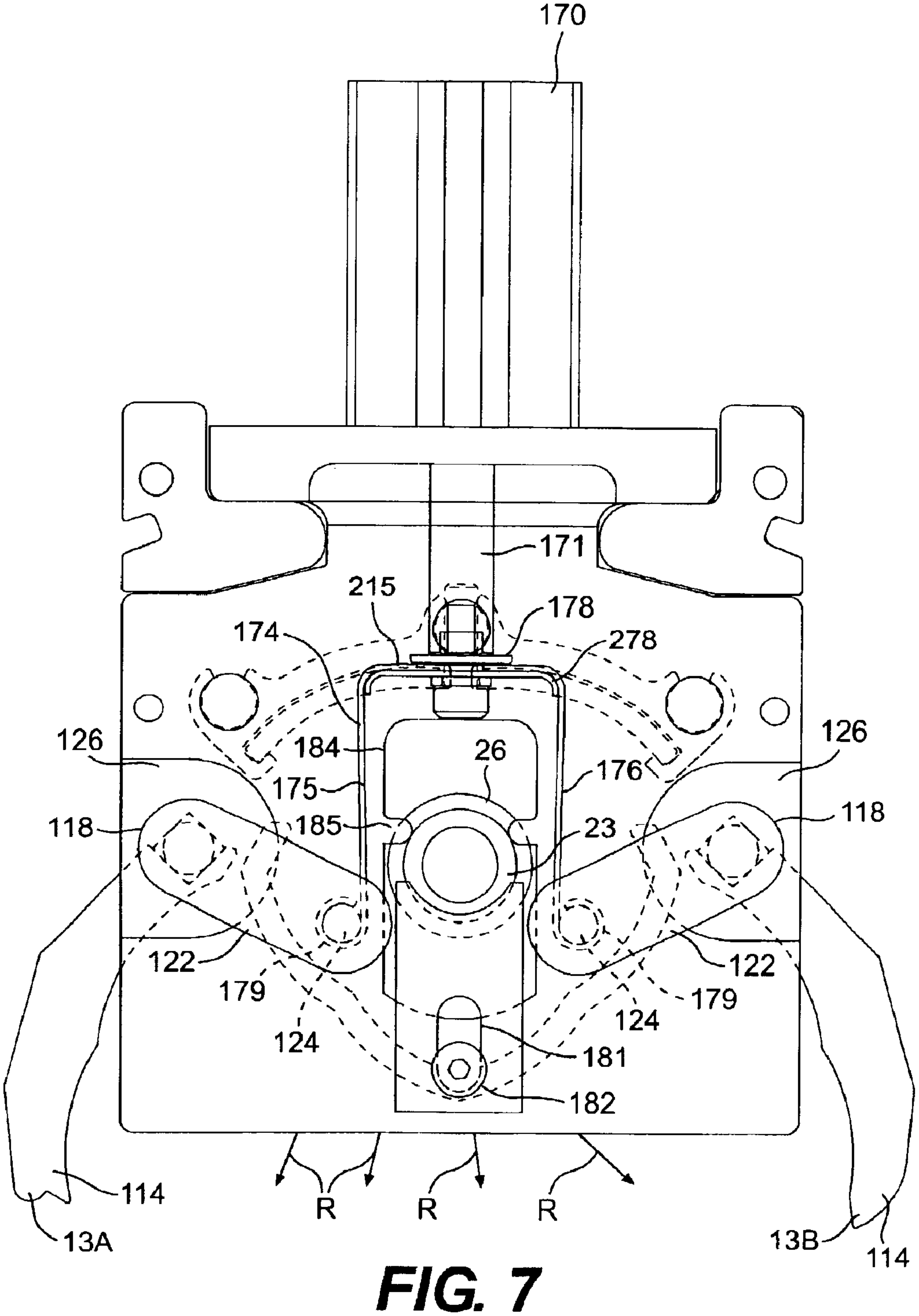
FIG. 7 is an end view of the drive mechanism of FIG. 4B attached to the two shutters of FIG. 3, the drive mechanism forcing a shutter spring into a lowered, i.e., shutter-open position.
Figure 8:
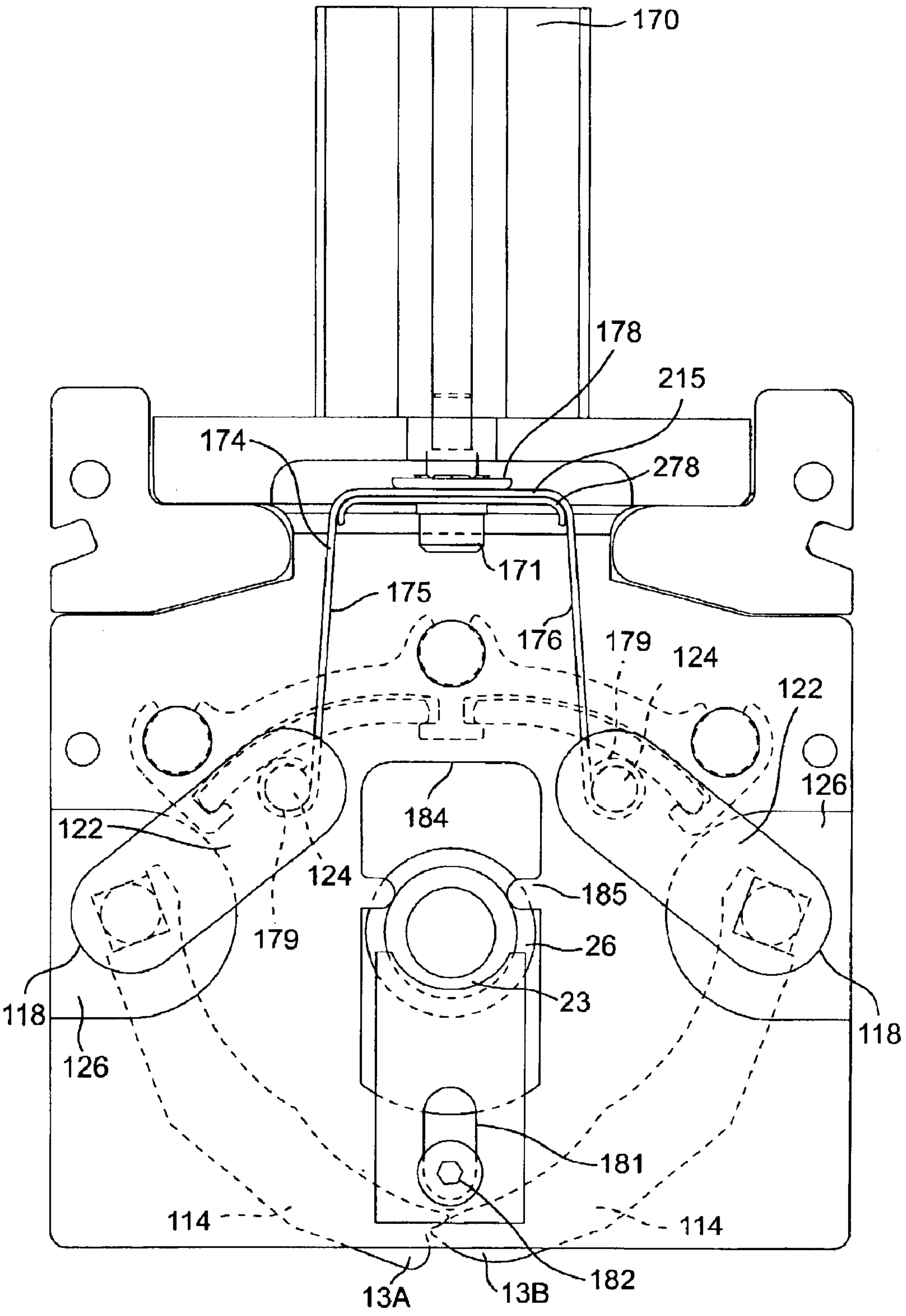
FIG. 8 is an end view of the drive mechanism of FIG. 4B attached to the two shutters of FIG. 3, the drive mechanism forcing a shutter spring into a raised, i.e., shutter-closed position.

FIGS. 7 and 8 are end views of the drive mechanism 120 of FIG. 4B attached to the two shutters of FIG. 3. In FIG. 7, the drive mechanism 120 is shown forcing the shutter spring 174 into a lowered, i.e., shutter-open position, whereas in FIG. 8, the drive mechanism 120 is shown forcing the shutter spring 174 into a raised, i.e., shutter-closed position.

As shown in FIG. 7, when the piston 171 of the air cylinder 170 is lowered, the spring arms 175, 176 are substantially perpendicular with respect to the top side 215 by a forced turning of the shaft connector 122. In other words, the second bosses 124 of the shaft connectors 122 are forced (in unison and by the piston 171) to travel along the circumference of circles having the axes of rotation of the first bosses 118 as center points and radii equal to the distance between the axes of rotation of the first bosses 118 and the central points of the second bosses 124.

As the second bosses 124 travel along the circumference of these circles, the spring arms 175, 176 are forced into the substantially perpendicular orientation as a result of the connection by the receptors 179 and the second bosses 124. It should also be readily noted, as previously discussed, that the connection between the receptors 179 and the second bosses 124, while the piston 171 is moving the shutter spring 174, is facilitated by the clearance between the second bosses 124 and the loop of the receptors 179.

When the shutter spring 174 is forced downward, the corresponding downward rotation of the shaft connectors 122 forces the shutters 114 in the open position shown in FIG. 7. In this position, light emitted by the lamp 26 can pass through the space between the shutters in the form of rays R, as shown.

When an operator chooses to discontinue the emanation of light rays R, the shutters 114 can be moved, in unison, into the closed position shown in FIG. 8. To achieve the closed position, the air cylinder 170 raises the piston 171 and shutter spring 174. As a result, the spring arms 175, 176 elastically bend outward, as shown, and the shaft connectors 122 rotate upward.

When the shaft connectors 122 rotate upward, the distal ends 13 of the shutters 114 approach each other and eventually contact each other. When the distal ends 13 of the shutters 114 contact each other, the light emitted by the lamp 26 will be completely, or at least substantially, contained within the shutter apparatus 100.

To enhance the amount of light contained within the shutter apparatus 100, when the shutters 114 are in the closed position, the distal ends 13 of the shutters 114 may be complementarily shaped, as shown in FIG. 8. For example, as shown, a first of the shutters 114 has a distal end 13A which is essentially notched. Correspondingly, the other shutter 114 has a distal end 13B which is sized to match-up with the distal end 13A of the first shutter 114, i.e., it engages the notch, as shown. As a result of this multisided engagement between the distal ends 13A, 13B of the shutters 114, the amount of light which may otherwise escape the shutter apparatus 100 is greatly reduced, if not completely eliminated.

Figure 9:
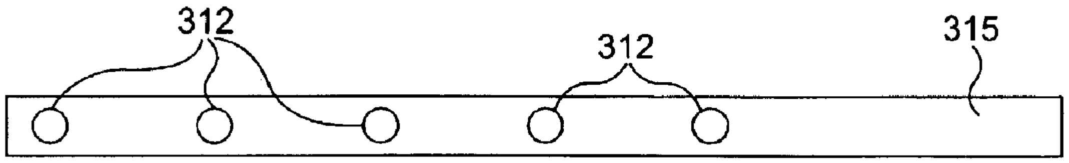
FIG. 9 is a side view of an alternate embodiment rectangular drive shaft.

FIG. 9 is a side view of an alternate embodiment rectangular drive shaft 315, which may be square in shape. Much like the aforementioned drive shaft 115, this drive shaft 315 has a plurality of holes 312 to receive fasteners 132 which will affix the shaft 315 to a shutter 114 along the attachment surface 130, according to the attachment protocol previously described. However, unlike the previous drive shaft 115 which terminated in the first boss 118, this alternate embodiment drive shaft 315 is adapted to be journalled through a cylindrical bearing 318 (of the type shown in FIG. 10) which is preferably formed of SAE type 660 bearing stock.

Figure 10:
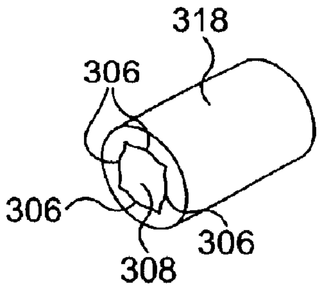
FIG. 10 is a perspective view of a bearing into which the drive shaft of FIG. 9 is adapted to be journalled.

As can be seen in FIG. 10, the bearing 318 has a generally rectangular shaped hole 308 therein. Each side of the hole

Figure 11:
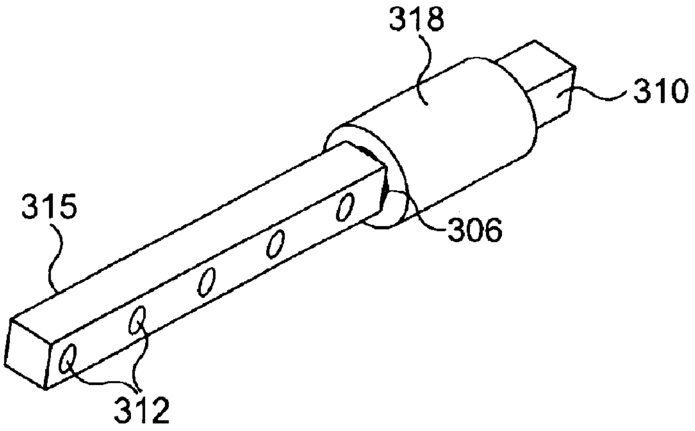
FIG. 11 is a perspective view of the drive shaft of FIG. 9 journalled into the bearing of FIG. 10.

308, however, has a notch 306 formed therein. When the shaft 315 is journalled through the bearing 318, as shown in FIG. 11, the notches 306 provide access to facilitate separating the bearing 318 and the shaft 315, if such separation becomes necessary (e.g., for purposes of replacing the shaft 315 and/or the bearing 318). When the shaft 315 is fully journalled through the bearing 318, a back portion 310 of the shaft 315 will project through the rear side of the bearing 318, as shown.

The bearing 318 has an outer diameter which is slightly less than the diameter of the pivot housing 126 shown in FIG. 3. Similar to the aforementioned embodiment, the diameter of the pivot housing 126 is preferably slightly (e.g., about 0.003") larger than the diameter of the bearing 318. Further, the length of the bearing 318 is substantially the same as the length of the pivot housing 126. As a result, the bearing 318 will be adapted to be housed by, and to rotate in, the pivot housing 126 in a manner similar to that of the previously described first boss 118. When the bearing 318 is housed in the pivot housing 126, the back portion 310 of the drive shaft 315 will project out of the pivot housing, as shown in FIG. 13. A mechanical engagement of the back portion 310 to the shutter spring 174 will be understood with reference to FIGS. 12 and 13.

Figure 12:
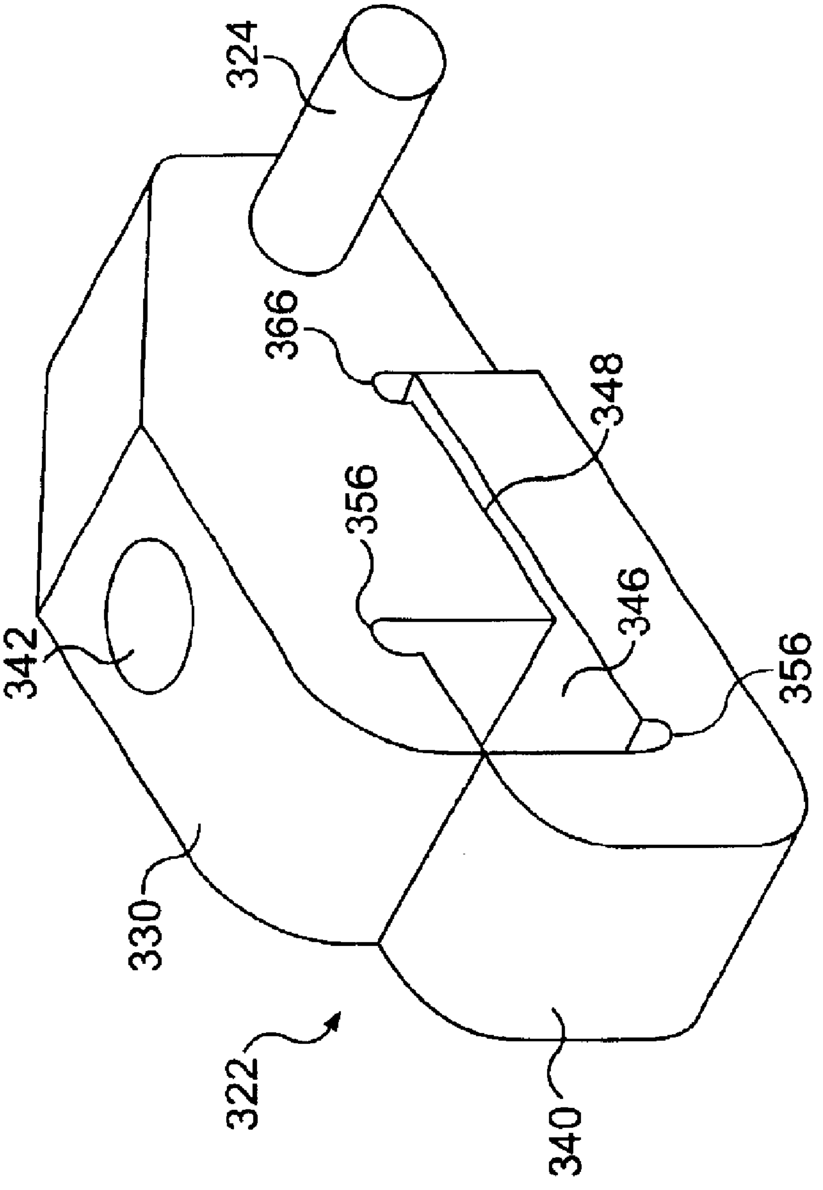
FIG. 12 is a perspective view of an alternate embodiment shaft connector adapted to engage the drive shaft of FIG. 9 and a shutter spring.
Figure 13:
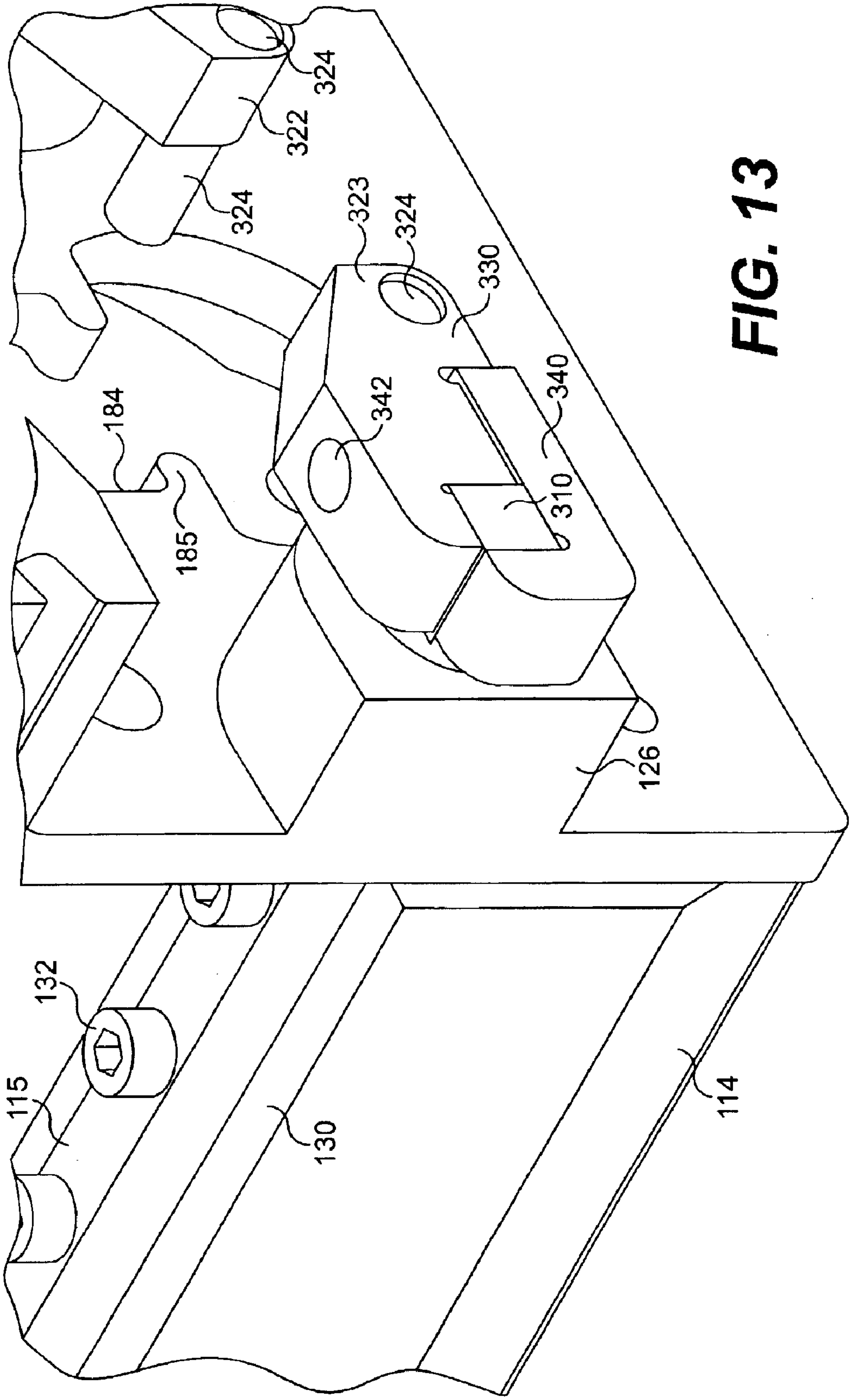
FIG. 13 is a side perspective view the shaft connector of FIG. 12 engaging the rectangular drive shaft of FIG. 9.

FIG. 12 shows an alternate embodiment shaft connector 322 which is adapted to engage the drive shaft 315 and a receptor 179 of the shutter spring 174. As shown, the shaft connector 322 is formed of an upper part 330 and a lower part 340 connected by a connector 342, which may be, for example, a screw. It should be readily apparent, however, that the shaft connector 322 may be formed of one integral part thereby eliminating the need for the connector 342.

When connected, the two parts 330, 340 of the shaft connector 322 define a rectangular shaped bore 346 which is sized to receive the back portion 310 of the drive shaft 315. The shaft connector 322 also has a second boss 324 which is sized to be received by a receptor 179 on the lower portion of a spring arm 176. Preferably, to reduce the complexity by which the shaft connector 322 is formed, the second boss 324 may be a separable piece which engages the upper portion 330. For example, the second boss 324 may be screwed into a bore in the upper portion 330.

Similar to the bearing 318, the shaft connector 322 may be formed with notches 356, 366. The notches 356, 366 may facilitate separating the upper part 330 from the lower part 340 or separating the shaft connector 322 from the drive shaft 315 and/or the receptor 179 of the shutter spring arm 176.

Finally, it should be readily apparent that the shaft connector 323 which engages the receptor 179 at the lower end of the other spring arm 175, in one embodiment, will be the mirror image of the aforementioned shaft connector 322. This mirror image shaft connector 323 is shown in FIG. 13 which shows the shaft connector 323 engaging a drive shaft 315. For ease of view, the shutter spring 174, which would be engaged by the second bosses 324 of the shaft connectors 322, 324, is not shown. When the shaft connectors 322, 322 engage the receptors 179 and the drive shafts 315, the shutters 114 will be opened and closed by the drive mechanism 120 in a manner essentially the same as that previously described.

Although the aforementioned describes preferred embodiments of the invention, the invention is not so restricted. It will be apparent to those skilled in the art that various modifications and variations can be made to the disclosed preferred embodiments of the present invention without departing from the scope or spirit of the invention. For example, by altering the shape of the attachment surface 130, the axis of rotation of the shutter 114 could be aligned with the central axis of the attachment portions 116 of the drive shaft 115 and/or pivot shaft 113 connected to the attachment surface 130.

In addition to the aforementioned modifications, the invention is not limited to the field of UV curing lamps. Accordingly, it should be understood that the apparatus and method described herein are illustrative only and are not limiting upon the scope of the invention, which is indicated by the following claims.

What is claimed is:

1. A shutter apparatus for a curing lamp housing, the apparatus comprising:

a shutter having a reflective surface and an attachment surface;

a drive shaft connected to the shutter along the attachment surface by at least one fastener; and a drive mechanism adapted to cause the shutter to rotate between an open position and a closed position, wherein the at least one fastener passes through the drive shaft in a direction which is not parallel to an axis of rotation of the drive shaft, and wherein the at least one fastener passes through the attachment surface.

2. The shutter apparatus according to claim 1, further comprising:

a shaft connector having two boss portions, wherein a first of the boss portions is connected to the drive shaft and is adapted to rotate in a pivot housing so that the shutter will rotate, and wherein a second of the boss portions is connected to the drive mechanism.

3. The shutter apparatus according to claim 1, wherein the drive shaft is connected to the shutter along the attachment surface by at least two first fasteners.

4. The shutter apparatus according to claim 3, wherein the fasteners are male threaded screws, and wherein the male threaded screws are received by female threaded bores formed in the attachment surface of the shutter.

5. The shutter apparatus according to claim 1, wherein the drive shaft has a non-circular cross section.

6. The shutter apparatus according to claim 5, wherein the drive shaft has a generally rectangular shaped cross section.

7. The shutter apparatus according to claim 2, wherein the drive mechanism comprises an air cylinder.

8. The shutter apparatus according to claim 7, wherein the drive mechanism further comprises a shutter spring having at least one spring arm comprising a receptor, and wherein the second boss is received by the receptor of the at least one spring arm.

9. The shutter apparatus according to claim 8, wherein the drive mechanism further comprises a strain reduction plate provided between the air cylinder and the shutter spring.

10. The shutter apparatus according to claim 9, wherein the air cylinder is adapted to raise and lower the shutter spring, and wherein the strain reduction plate is adapted to reduce strain experienced by the shutter spring when the shutter spring is raised and lowered.

11. The shutter apparatus according to claim 9, wherein the drive mechanism further comprises a leaf spring provided on a side of the shutter spring opposite the strain reduction plate.

12. The shutter apparatus according to claim 11, wherein the air cylinder is adapted to raise and lower the shutter spring, and wherein the strain reduction plate and the leaf spring are adapted to reduce strain experienced by the shutter spring when the shutter spring is raised and lowered.

13. The shutter apparatus according to claim 8, wherein the air cylinder is adapted to raise and lower the shutter spring.

14. The shutter apparatus according to claim 13, wherein when the shutter spring is lowered, the spring arm will elastically bend in a first spring direction thereby forcing the shaft connector and the shutter to rotate in a first rotation direction along the axis of rotation of the drive shaft.

15. The shutter apparatus according to claim 14, wherein when the shutter spring is raised, the spring arm will elastically bend in a second spring direction thereby forcing the shaft connector and the shutter to rotate in a second rotation direction along the axis of rotation of the drive shaft, wherein the first spring direction is opposite the second spring direction, and wherein the first rotation direction is opposite the second rotation direction.

16. The shutter apparatus according to claim 1, further comprising:

a bearing having a hole therein though which the drive shaft is journalled such that a back portion of the drive shaft projects from the bearing, wherein the bearing is adapted to rotate in a pivot housing so that the shutter will rotate.

17. The shutter apparatus according to claim 16, further comprising:

a shaft connector engaged to back portion of the drive shaft, wherein a second boss of the shaft connector is connected to the drive mechanism.

18. The shutter apparatus according to claim 17, wherein the drive mechanism comprises an air cylinder.

19. The shutter apparatus according to claim 18, wherein the drive mechanism further comprises a shutter spring having at least one spring arm comprising a receptor, and wherein the second boss is received by the receptor of the at least one spring arm.

20. The shutter apparatus according to claim 19, wherein the drive mechanism further comprises a strain reduction plate provided between the air cylinder and the shutter spring.

21. The shutter apparatus according to claim 20, wherein the air cylinder is adapted to raise and lower the shutter spring, and wherein the strain reduction plate is adapted to reduce strain experienced by the shutter spring when the shutter spring is raised and lowered.

22. The shutter apparatus according to claim 19, wherein the air cylinder is adapted to raise and lower the shutter spring.

23. The shutter apparatus according to claim 22, wherein when the shutter spring is lowered, the spring arm will elastically bend in a first spring direction thereby forcing the shaft connector and the shutter to rotate in a first rotation direction along the axis of rotation of the drive shaft.

24. The shutter apparatus according to claim 23, wherein when the shutter spring is raised, the spring arm will elastically bend in a second spring direction thereby forcing the shaft connector and the shutter to rotate in a second rotation direction along the axis of rotation of the drive shaft, wherein the first spring direction is opposite the second spring direction, and wherein the first rotation direction is opposite the second rotation direction.

25. A shutter apparatus for a curing lamp housing, the apparatus comprising:

first and second shutters, each having a reflective surface and an attachment surface;

a first drive shaft connected to the first shutter along the attachment surface thereof by at least one fastener, the at least one fastener passing through the first drive shaft and the attachment surface in a direction which is not parallel to an axis of rotation of the first drive shaft;

a second drive shaft connected to the second shutter along the attachment surface thereof by at least one fastener, the at least one fastener passing through the second drive shaft and the attachment surface in a direction which is not parallel to an axis of rotation of the second drive shaft; and a drive mechanism adapted to cause the shutters to rotate substantially in unison between an open position and a closed position.

26. The shutter apparatus according to claim 25, wherein the drive mechanism comprises:

an air cylinder; and a shutter spring having first and second spring arms each comprising a receptor.

27. The shutter apparatus according to claim 26, further comprising:

a first shaft connector having two boss portions, wherein a first of the boss portions is connected to the first drive shaft and is adapted to rotate in a first pivot housing so that the first shutter will rotate, and wherein a second of the boss portions is connected to the receptor of the first spring arm; and a second shaft connector having two boss portions, wherein a first of the boss portions is connected to the second drive shaft and is adapted to rotate in a second pivot housing so that the second shutter will rotate, and wherein a second of the boss portions is connected to the receptor of the second spring arm.

28. The shutter apparatus according to claim 26, wherein the drive mechanism further comprises a strain reduction plate provided between the air cylinder and the shutter spring.

29. The shutter apparatus according to claim 28, wherein the air cylinder is adapted to raise and lower the shutter spring, and wherein the strain reduction plate is adapted to reduce strain experienced by the shutter spring when the shutter spring is raised and lowered.

30. The shutter apparatus according to claim 28, wherein the drive mechanism further comprises a leaf spring provided on a side of the shutter spring opposite the strain reduction plate.

31. The shutter apparatus according to claim 30, wherein the air cylinder is adapted to raise and lower the shutter spring, and wherein the strain reduction plate and the leaf spring are adapted to reduce strain experienced by the shutter spring when the shutter spring is raised and lowered.

32. The shutter apparatus according to claim 26, wherein the air cylinder is adapted to raise and lower the shutter spring.

33. The shutter apparatus according to claim 32, wherein when the shutter spring is lowered, the spring arms will elastically bend, substantially in unison, either toward or away from each other thereby forcing the first and second shaft connectors to rotate, and wherein the rotation of the first and second shaft connectors forces the first and second shutters to rotate either toward or away from each other along the axes of rotation of the first and second drive shafts.

34. The shutter apparatus according to claim 33, wherein when the shutter spring is raised, the spring arms will elastically bend, substantially in unison, in the other of either toward or away from each other thereby forcing the first and second shaft connectors to rotate, and wherein the rotation of the first and second shaft connectors forces the first and second shutters to rotate in the other of either toward or away from each other along the axes of rotation of the first and second drive shafts.

35. The shutter apparatus according to claim 25, further comprising:

a first mount rail provided substantially parallel to the first shutter; and a second mount rail provided substantially parallel to the second shutter, wherein the first and second mount rails are adapted to enable the shutter apparatus to be pushed into and/or pulled out of a curing lamp housing as an integral unit.

36. The shutter apparatus according to claim 35, wherein each of the mount rails has a recess formed therein, and wherein the recesses are adapted to receive correspondingly sized ribs projecting from inner walls of the curing lamp housing.

37. A curing lamp apparatus comprising:

a light source adapted to radiate light; and a shutter apparatus adapted to trap a substantial portion of the light radiated by the light source, the shutter apparatus comprising:

a first shutter having a reflective surface and an attachment surface;

a first drive shaft connected to the first shutter along the attachment surface by at least one fastener, the at least one fastener passing through the first drive shaft and the attachment surface in a direction which is not parallel to an axis of rotation of the first drive shaft;

a drive mechanism; and a first shaft connector having two boss portions, wherein a first of the boss portions is connected to the first drive shaft and is adapted to rotate in a pivot housing so that the first shutter will rotate, and wherein a second of the boss portions is connected to the drive mechanism.

38. The lamp apparatus according to claim 37, wherein the drive mechanism comprises:

an air cylinder; and a shutter spring having first and second spring arms each comprising a receptor, wherein the second of the boss portions of the first shaft connector is connected to the receptor of the first spring arm.

39. The lamp apparatus according to claim 38, wherein the shutter apparatus further comprises:

a second shutter connected to a second drive shaft along an attachment surface by at least one fastener, the at least one fastener passing through the second drive shaft in a direction which is not parallel to an axis of rotation of the second drive shaft;

a second shaft connector having two boss portions, wherein a first of the boss portions is connected to the second drive shaft and is adapted to rotate in a second pivot housing so that the second shutter will rotate, and wherein a second of the boss portions is connected to the receptor of the second spring arm.

40. The curing lamp apparatus according to claim 38, wherein the drive mechanism further comprises a strain reduction plate provided between the air cylinder and the shutter spring.

41. The curing lamp apparatus according to claim 40, wherein the air cylinder is adapted to raise and lower the shutter spring.

42. The curing lamp apparatus according to claim 41, wherein the strain reduction plate is adapted to reduce strain experienced by the shutter spring when the shutter spring is raised and lowered.

43. The curing lamp apparatus according to claim 42, wherein when the shutter spring is lowered, the spring arms will elastically bend, substantially in unison, either toward or away from each other thereby forcing the first and second shaft connectors to rotate, and wherein the rotation of the first and second shaft connectors forces the first and second shutters to rotate either toward or away from each other along the axes of rotation of the first and second drive shafts.

44. The curing lamp apparatus according to claim 43, wherein when the shutter spring is raised, the spring arms will elastically bend, substantially in unison, in the other of either toward or away from each other thereby forcing the first and second shaft connectors to rotate, and wherein the rotation of the first and second shaft connectors forces the first and second shutters to rotate in the other of either toward or away from each other along the axes of rotation of the first and second drive shafts.

45. The curing lamp apparatus according to claim 37, wherein the light radiated by the light source has a plurality of wavelengths including light having a wavelength in a first range and a wavelength outside of the first range, and wherein the lamp apparatus is located within a housing comprising:

a band-pass filter positioned in the path of at least some of the light which the light source is adapted to radiate, the band-pass filter being adapted to reflect light having wavelengths in the first range and to transmit light having wavelengths outside of said first range.

46. The curing lamp apparatus according to claim 45, wherein the housing further comprises:

a heat sink, wherein the band-pass filter is positioned between the light source and the heat sink.

47. The curing lamp apparatus according to claim 45, wherein the band-pass filter is a cold mirror.

48. The curing lamp apparatus according to claim 45, wherein the band-pass filter is a hot mirror.

49. The curing lamp apparatus according to claim 40, wherein the drive mechanism further comprises a leaf spring provided on a side of the shutter spring opposite the strain reduction plate.

50. The curing lamp apparatus according to claim 49, wherein the air cylinder is adapted to raise and lower the shutter spring, and wherein the strain reduction plate and the leaf spring are adapted to reduce strain experienced by the shutter spring when the shutter spring is raised and lowered.

51. A method of replacing shutters in a curing lamp housing, the method comprising the steps of:

removing a used shutter apparatus at least partially out of a curing lamp housing, the used shutter apparatus comprising at least one used shutter and a drive mechanism adapted to rotate said used shutter between an open position in which light emitted by a light source in the curing lamp housing is radiated out of the housing and a closed position in which the light emitted by the light source is substantially contained within the shutter apparatus;

removing at least one fastener connecting the used shutter to a drive shaft, wherein the at least one fastener passes through the drive shaft in a direction which is not parallel to an axis of rotation of the drive shaft;

replacing the used shutter with a new shutter;

fastening the new shutter to the drive shaft by means of the at least one fastener to create a new shutter apparatus; and returning the new shutter apparatus into the curing lamp housing.

52. The method according to claim 51, wherein the step of pulling the used shutter apparatus out of the cutting lamp housing comprises sliding mount rails of the used assembly along ribs formed in the cutting lamp housing.

53. The method according to claim 52, wherein the mount rails comprise recesses, and wherein the recesses are sized to receive the ribs formed in the curing lamp housing.

* * * * *